May 8, 1923.
C. E. STURGIS
1,454,192
FLEXIBLE CABLE RELEASE AND METHOD OF ASSEMBLING SAME
Filed July 29, 1921
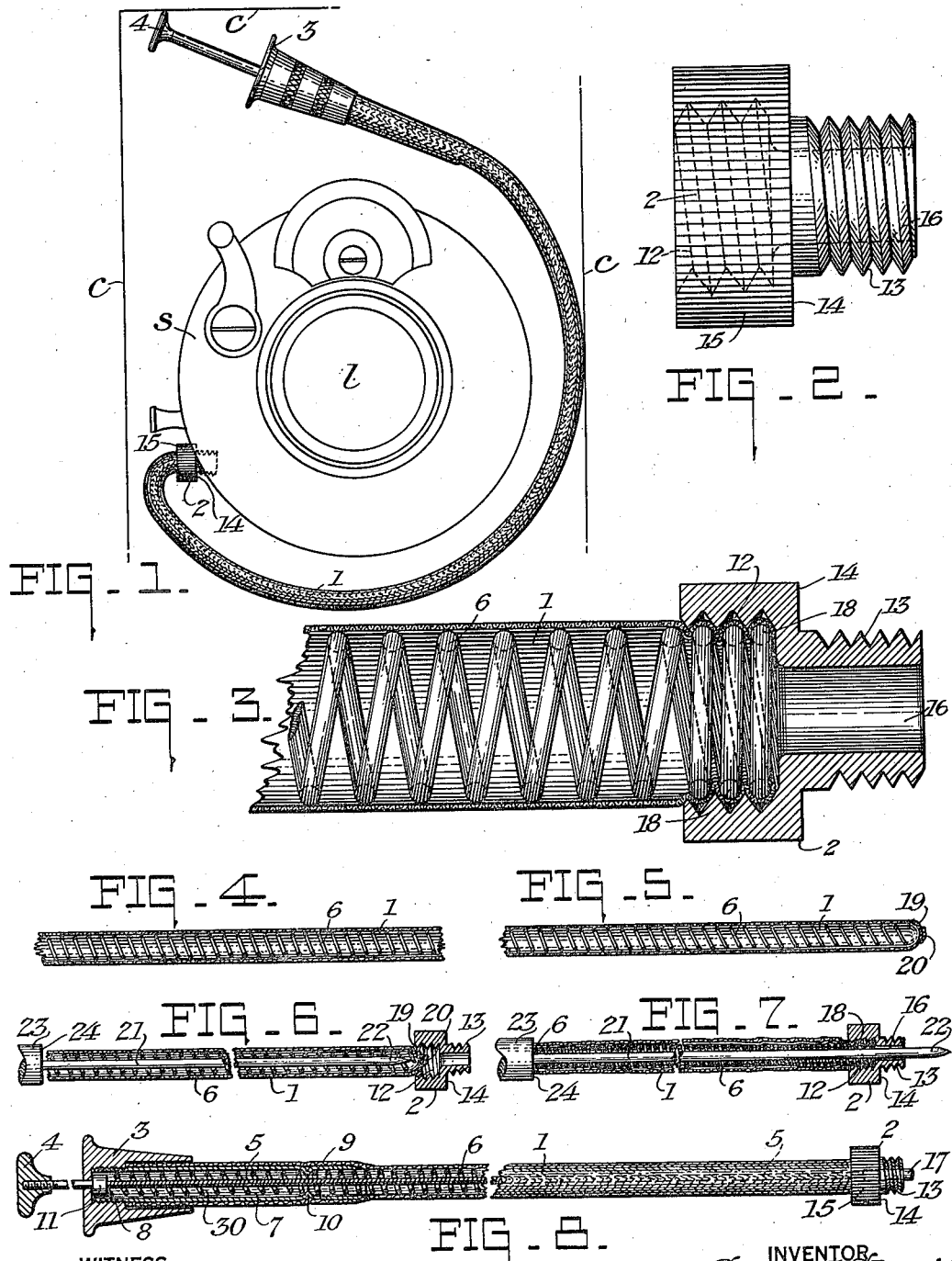
INVENTOR
Charles E. Sturgis,
BY
ATTORNEYS.

Patented May 8, 1923.

1,454,192

UNITED STATES PATENT OFFICE.

CHARLES E. STURGIS, OF ROCHESTER, NEW YORK, ASSIGNOR TO EASTMAN KODAK COMPANY, OF ROCHESTER, NEW YORK, A CORPORATION OF NEW YORK.

FLEXIBLE-CABLE RELEASE AND METHOD OF ASSEMBLING SAME.

Application filed July 29, 1921. Serial No. 488,477.

*To all whom it may concern:*

Be it known that I, CHARLES E. STURGIS, a citizen of the United States of America, residing at Rochester, in the county of Monroe and State of New York, have invented certain new and useful Improvements in Flexible-Cable Releases and Methods of Assembling Same, of which the following is a full,clear, and exact specification.

This invention relates to photography and particularly to shutter actuating devices sometimes known as flexible cable releases which consist of two relatively slidable tubular members, one working within the other for exerting a thrust and pull upon different parts of a camera shutter, thereby actuating it. My invention more particularly applies to a structure by which a coiled spring (of which the flexible members may be made) can be attached to a ferrule which fits on the end of the spring. I have described as an application of this structure the cable covering and the shutter ferrule, although obviously my invention can be applied to other parts of a cable release.

One object of my invention is to provide an extremely flexible cable release which permits of coiling into a very limited space. Another object is to provide a cable release consisting of but few easily assembled parts. Another object is to provide such a release with a very short shutter ferrule. Another object is to provide an extremely tight connection between a flexible cable and a ferrule; and a further object is to provide a method of assembling the various parts which lends itself to production in quantities without excessive cost. To these and other objects the invention resides in certain improvements and combinations of parts all as will be described, the novel features being pointed out in the claims at the end of the specification.

In the drawings, in which like reference characters denote like parts throughout:

Fig. 1 is a side view of a cable release constructed in accordance with and illustrating one embodiment of my invention, a shutter and parts of a camera being shown in unshaded lines;

Fig. 2 is an enlarged side view of the shutter ferrule;

Fig. 3 is an enlarged section through the flexible cable at the shutter end;

Figs. 4, 5, 6, and 7 are sections showing different steps in assembling my release; and Fig. 8 is a part section and part elevation of a complete cable release.

In Fig. 1, the lines $c$ represent the opening in the body of a camera into which the lens $b$, shutter $s$ and cable release 1 must be folded in closing the camera. This drawing is not to scale, but gives nevertheless an idea of the relative sizes of these parts, showing the necessity for a short shutter ferrule 2 and a very flexible cable 1.

An operator manipulates finger grips or ferrules 3 and 4 to actuate the shutter, 3 being attached to the outer cable 1, and 4 being attached to the end of the inner cable or thrust member 5. The construction of these parts do not form a part of this invention, being similar to the corresponding parts shown in U. S. patent granted to Dakin and Underwood, No. 1,297,327, March 18, 1919. To make the device as a whole clear, I will describe these parts. The outer cable 1 is held extended by an open coiled spring 6. A rigid sleeve 7, after being coated with glue on the outside is slipped into the covering 1, leaving only the threaded portion 8 exposed. This brings the end 9 of spring 6 against shoulder 10 of sleeve 7. The ferrule 3 is screwed on thread 8 after inserting the inner cable 5, and spring 30 which tends to thrust outwardly upon shoulder 11, thus keeping ferrule 4, and with it cable 5, normally separated from ferrule 3, which is in the position for actuating the shutter.

Coming now to the features of my invention, the shutter ferrule 2 is threaded at 12 and 13, and has a shoulder 14 at one side of a serrated finger grip 15. The shoulder forms a stop limiting the inward movement of the ferrule into the shutter $s$. A smooth bore 16 provides a slideway for the shutter actuating ferrule 17 on the end of flexible cable 5.

Where a short shutter ferrule is used it is very important that the cable 1 be united with it firmly and that only a comparatively short space be used for this purpose. I have found by experiment that a joint of the proper type can be made between the flexible cable 1 and the ferrule 2 by placing the end 18 of the spring 6 under tension and in this condition using it as a thread to mesh with thread 12 of ferrule 2, the cover 1 being bound between the two threads. Glue may or may not be used on the outside of cover 1 to assist in uniting the cover and threads 12. Such a spring tension, whether the tension is caused by expansion or compression, causes a pressure to be exerted by the spring convolutions forming the thread upon the ferrule thread which binds the parts securely together. This binding action not only holds the parts together, but prevents the ferrule from being unscrewed as long as the remainder of the coils of spring 6 are of different spacing, the tension of the spring forming an effective nut lock. In addition the fit between the screw thread and the ferrule thread can be very loose, because the tension causes the spring to bind on one side or the other (according as the tension is caused by expansion or contraction) of the ferrule threads. This feature is important, as the nature of the cover can be changed without altering the tools used in making the springs and ferrules. Thus the thickness of the covers may vary within reasonable limits without changing the effect of the joint. In this instance I prefer to compress the convolutions 18, as a shorter joint can thus be formed.

In order to assemble a joint of this kind I find the following method satisfactory: A spring 6, having the convolutions spaced as desired, is inserted into a casing or cover 1, (Fig. 4) after which one end 19 is dipped in glue 20 and pointed, as is shown in Fig. 5. An assembling rod 21 is then used for the next step. This rod, 21, is pointed at one end 22 and is equipped with an enlarged handle 23, the handle forming a shoulder with rod 21 at their point of connection 24. The cover and spring are slipped lightly over rod 21 and the pointed end 19 of the cover is inserted into the thread 12. The cover is usually made of woven material which has rough or frayed ends. This presents no difficulties with my method as the pointed end 19 unites, for the time, the frayed strands enabling the operator easily to insert it into thread 12, as is shown in Fig. 6. The handle 23 is then grasped and as the point is thrust inwardly through the bore 16 of ferrule 2 it opens up the pointed end 19 to approximately the size of the bore, and by a further movement shoulder 24 contacts with spring 6, compressing it throughout its length, as shown in Fig. 7. The end convolutions 18 then turn freely into threads 12 binding the cover in between them. I prefer to use a little glue on the cover which contacts with threads 12. This can be applied when tipping (if the operations on one release are continuous) or separately just before the assembling rod is used. When the assembling rod is withdrawn, the convolutions of spring 6 return to their original spacing, save convolutions 18, which are held by threads 12. The tendency of convolutions 18 to return to their original spacing securely joins the parts.

After these parts are assembled, the finger grip ferrules 3 and 4 can be assembled, as described in the second paragraph after the figure description.

In this way an extremely flexible cable release can be made and assembled with comparatively few parts, and by simple operations. While I have described the distorted spring thread as applying to the cable and shutter ferrule, by way of example, it is obvious that this type of connection can be used for other parts of the cable if so desired.

Having thus described my invention, what I claim as new and desire to secure by Letters Patent is:

1. In a flexible cable shutter release, the combination with two flexible members movable longitudinally of each other, of ferrules on the ends of the flexible members, one ferrule having a threaded portion, and one flexible member comprising a coiled wire spring, with the coils at the end of the spring under tension and engaged by the threaded portion of the ferrule, whereby a firm joint is maintained between the parts.

2. In a shutter release, the combination with an outer flexible tubular casing, and an inner flexible cable, both terminating in finger ferrules at one end, of a threaded shutter engaging member at the other end of one of the flexible members, said last named flexible member including a spring, a portion of said spring having convolutions of different spacing from the convolutions of the remainder of the spring to provide a thread adapted to engage and bind with the thread on the shutter engaging member, forming a tight connection therewith.

3. In a shutter release, the combination with an outer flexible tubular casing and an inner flexible cable, both terminating in finger ferrules at one end, a shutter ferrule including a screw thread, one flexible member terminating in said shutter ferrule, said flexible member including an open coiled spring, the flexible member being fastened to the ferrule by a screw formed by compressing a section of the spring, the screw fastening into the thread of the ferrule.

4. In a shutter release the combination with two flexible cables movable longitudinally relative to each other, of ferrules on the ends of the flexible members, one of said flexible members including an outer casing with an open coiled spring inside of the casing, one ferrule having a threaded portion, one end of the spring being compressed, this compressed portion forming a thread which meshes with the thread of the ferrule, the end of the casing being held between the two threads.

5. The method of assembling a cable release including a flexible coiled spring cable which terminates in a rigid ferrule, consisting of altering the spaces between the convolutions of a portion of the spring to form a thread which will engage a thread on the ferrule.

6. The method of assembling a flexible cable including a coiled spring cable with a cover thereon, and a rigid threaded ferrule at one end, which comprises the following steps: first, placing the spring inside of the covering and pointing one end of the covering with glue; second, entering the pointed end of the covering into a threaded aperture in the ferrule; third, compressing the spring until the pitch of the thread formed by the compressed spring coils is approximately that of the threaded ferrule; fourth, screwing the spring into the ferrule, binding the cover therebetween; and fifth, releasing the pressure on the spring allowing the convolutions not engaging the threaded ferrule to assume their original spacing, thus allowing the spring thread to bind in the ferrule thread.

7. The method of assembling a flexible cable release including a coiled spring cable with a rigid threaded ferrule on the end, which comprises the tensioning of a portion of the coiled spring convolutions so that the pitch of a thread thus formed will approximate that of the ferrule, and of screwing the two threads together and releasing the tension on the spring convolutions, enabling them to press the threads of the ferrule, thus binding the parts together.

8. The method of assembling a flexible cable release including a covered coiled spring cable with a rigid threaded ferrule on the end, which comprises pointing one end of the cable cover by means of glue; slipping the cover and coiled spring on a pointed shouldered rod and entering the point of the cable in the threaded portion of the ferrule; moving the pointed shoulder rod so as to open the previously glue pointed cover end and compressing the spring; screwing the ferrule on the thread formed by compressing the spring and holding the cover between the two threads; withdrawing the shoulder rod allowing the spring convolutions to return to their natural spacings, save those convolutions of the spring forming the thread, the thread convolutions being under tension and binding, with the cover, against the screw threads of the ferrule.

Signed at Rochester, New York, this 26th day of July, 1921.

CHARLES E. STURGIS.